United States Patent [19]

Magee

[11] Patent Number: 5,303,525
[45] Date of Patent: Apr. 19, 1994

[54] SIDING OR ROOFING EXTERIOR PANELS FOR CONTROLLED SOLAR HEATING

[75] Inventor: John A. Magee, Fayetteville, Ark.

[73] Assignee: University of Arkanas, Little Rock, Ark.

[21] Appl. No.: 948,109

[22] Filed: Sep. 21, 1992

Related U.S. Application Data

[63] Continuation of Ser. No. 524,975, May 18, 1990, abandoned, and a continuation-in-part of Ser. No. 779,646, Oct. 21, 1991.

[51] Int. Cl.$^5$ ............................................... E04B 5/46
[52] U.S. Cl. .................................... 52/306; 52/309.1; 52/553; 52/606
[58] Field of Search .............. 52/306, 606, 553, 309.1, 52/173 R; 359/167, 442, 445, 446, 463, 613

[56] References Cited

U.S. PATENT DOCUMENTS

| | | | |
|---|---|---|---|
| 2,279,825 | 4/1942 | Kaszab | 359/463 |
| 2,560,538 | 7/1951 | Ayres | 359/463 |
| 2,714,816 | 8/1955 | Pennell | 52/306 X |
| 2,766,861 | 10/1956 | Abramson | 52/533 X |
| 2,993,409 | 7/1961 | Boyd | 52/306 X |
| 3,012,477 | 12/1961 | Lodge | 52/306 X |
| 3,241,429 | 3/1966 | Rice et al. | |
| 3,255,665 | 6/1966 | Weiher et al. | 88/60 |
| 3,365,350 | 1/1968 | Cahn | 359/463 X |
| 3,568,387 | 3/1971 | Grabow | 52/306 |
| 3,940,896 | 3/1976 | Steel | 52/307 |
| 4,067,807 | 1/1978 | Strand | 52/606 X |
| 4,069,809 | 1/1978 | Strand | 52/606 X |
| 4,101,210 | 7/1978 | Lo et al. | 359/463 x |
| 4,102,106 | 7/1978 | Golder et al. | 52/553 X |
| 4,111,695 | 9/1978 | Yevick | 359/463 X |
| 4,283,451 | 8/1981 | Abrahami | 52/309.1 X |
| 4,327,528 | 5/1982 | Fritz | 52/533 X |
| 4,327,708 | 5/1982 | Taylor | |
| 4,435,933 | 3/1984 | Krawl | 52/309.1 |
| 4,557,253 | 12/1985 | Talbert et al. | |
| 4,617,774 | 10/1986 | Pittman et al. | 52/553 X |
| 4,782,638 | 11/1988 | Hovind | 52/553 X |
| 4,935,335 | 6/1990 | Fotland | 359/463 X |
| 5,039,352 | 8/1991 | Mueller et al. | 52/173 R X |

FOREIGN PATENT DOCUMENTS 569237 7/1958 Belgium ............................ 52/306

OTHER PUBLICATIONS

Development of Solar Energy Absorbing Residential Siding; Melinda J. Palmer, Robert Falcinelli, Rick J. Couvillion, Ph.D., P. E., Marcus C. Langston, P. E.; presented Jun. 16, 1992, Orlando, Fla., Annual American Solar Energy Conference.

Primary Examiner—Carl D. Friedman
Assistant Examiner—Lan C. Mai
Attorney, Agent, or Firm—Robert R. Keegan

[57] ABSTRACT

There is disclosed a building structure partially covered with siding panels, the outer surface of which are transparent to solar energy, the panels being slightly spaced from an insulating wall of the building to allow a fluid flow, preferably air, therebetween with effective heat exchange from a solar radiation absorbing surface with the fluid being selectively utilizable for space heating purposes or other purposes. The air can be moved by fans or convection or both. A preferred embodiment employs small horizontal lenticular lenses in the transparent material on the surface of the siding together with a mask, which may be three dimensional, on the back of the siding with the result that when the siding is viewed from the horizontal it displays a decorative color while it is highly reflective for solar rays at high angles of elevation and is transparent for solar rays at low angles of elevation, as during winter months. A black absorbent metallic foil surface may be provided on the insulating wall for absorbing the unmasked solar radiation, and the siding is structured to direct airflow to enhance heat transfer from the radiation absorbing surface. Alternative embodiments utilize spherical lens arrangements and provide panels adapted for roof use with horizontal or low angle orientation. The panels disclosed provide efficient solar heating during the winter with virtually no heat load in the summer, and can have a conventional appearance of any desired color to passersby.

20 Claims, 8 Drawing Sheets

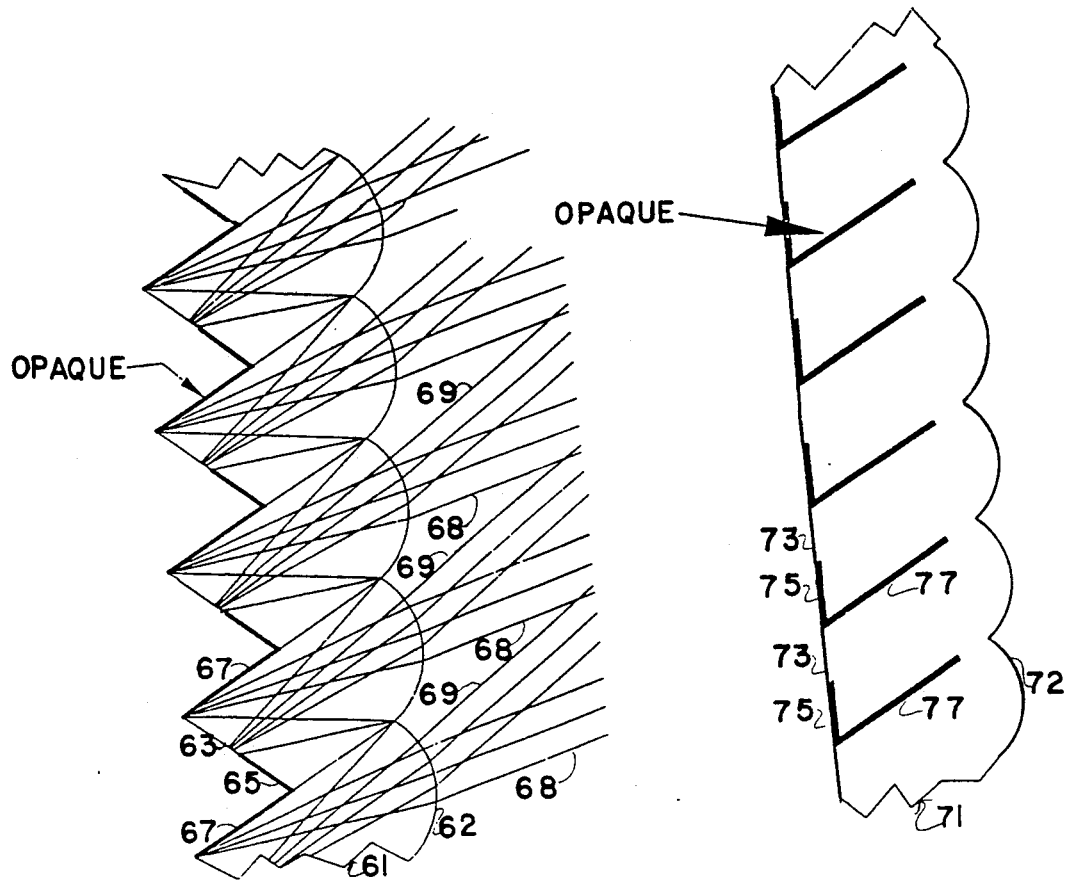
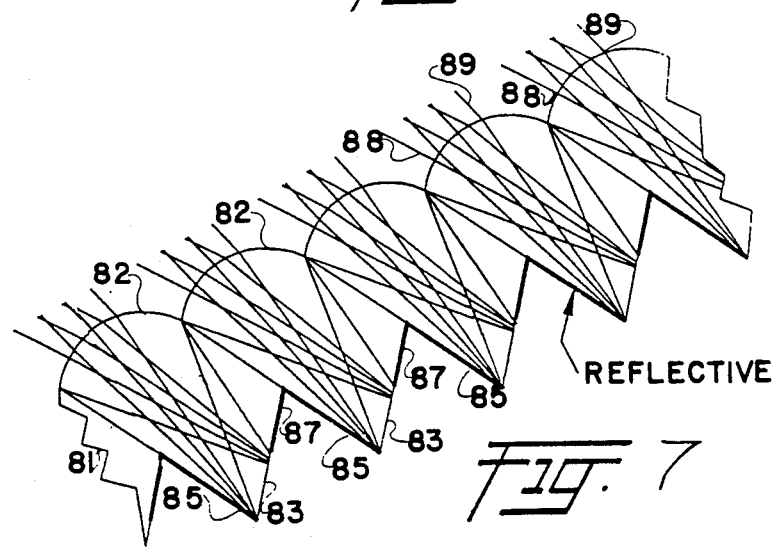

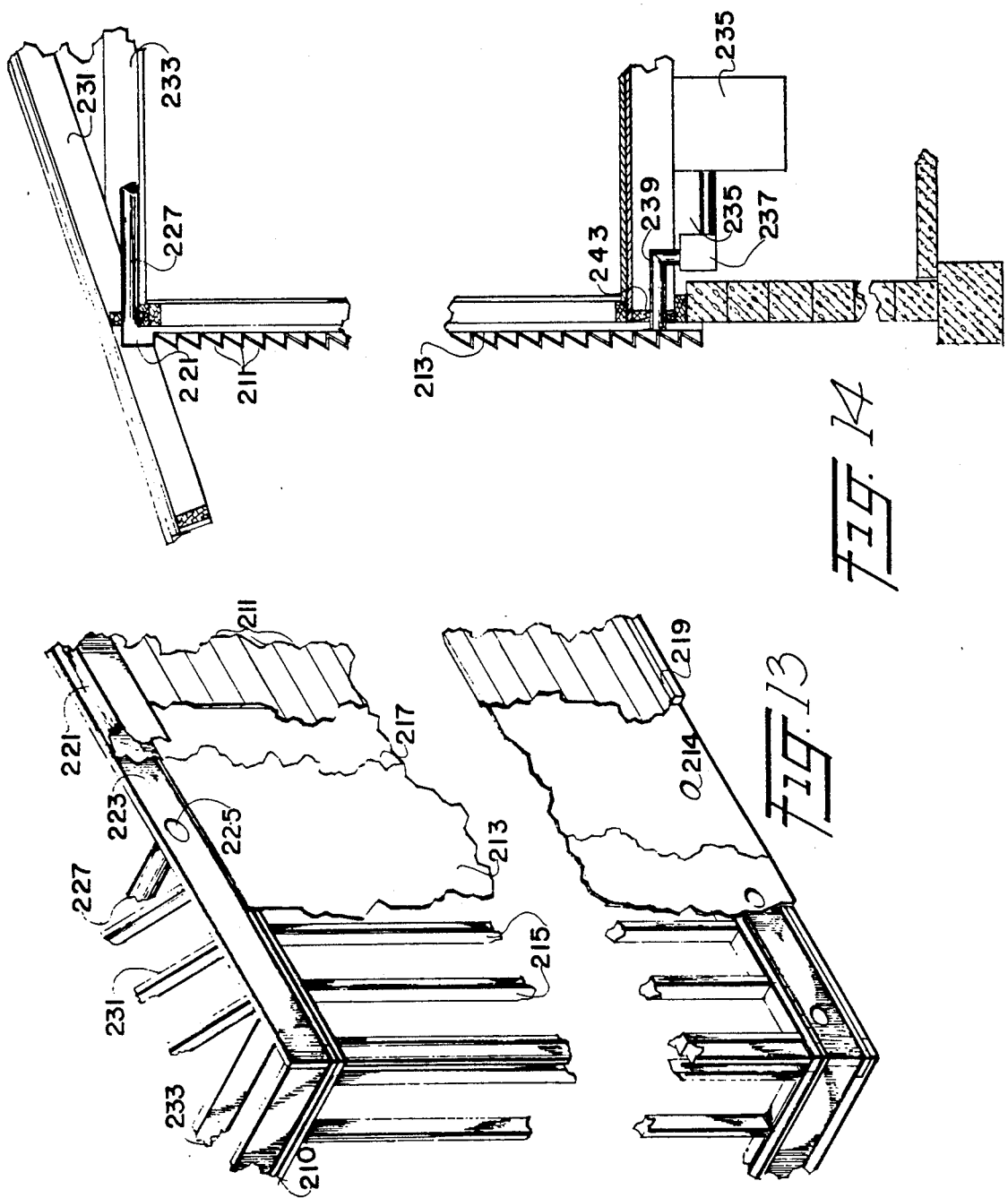

SIDING OR ROOFING EXTERIOR PANELS FOR CONTROLLED SOLAR HEATING

This application is a continuation of my application titled SIDING OR ROOFING EXTERIOR PANELS FOR CONTROLLED SOLAR HEATING, Ser. No. 07/524,975, filed May 18, 1990 now abandoned, and is a continuation-in-part of my application titled SOLAR ENERGY CONTROL FILM AND PROCESS, Ser. No. 07/779,646, filed Oct. 21, 1991.

The present invention relates to solar heating for residential buildings or other buildings wherein the exterior walls and/or roof on the sunny side of the structure are formed in a manner to act as solar heat collecting apparatus. While it is obviously desirable to be able to cover essentially the entire sunny side of a structure with solar heat collection apparatus, there have been serious problems standing in the way from a practical point of view. First of all, solar collection apparatus inheritantly must have a light absorbing surface and consequently generally has a dark color which is very unattractive. Any attempts to make the solar collection apparatus less unattractive generally has severely impacted on its efficiency and effectiveness. Even if unattractive appearance is accepted as inevitable, the capital cost of conventional solar heat collection apparatus for such a large area would be quite high to achieve even moderately good energy collection efficiency.

The present invention provides a controlled solar heating system in which exterior siding panels of novel construction include transparent plastic material having lenses formed therein which allow passage of light (solar radiation) through to an absorbing heat collector only for rays impinging on the structure at a low elevation angle corresponding to wintertime solar elevation at the latitude at which the structure is located. In particular embodiments, a lens and mask combination built into the siding panel causes light rays striking the panel at near horizontal elevation to impinge on a mask portion which has a desired color for decorative purposes. By the principle of reciprocity, a viewer of the structure would see light reflected from this colored portion of the mask with the result that the siding would appear to have a desired color for decorative purposes to the passerby; this notwithstanding the fact that the sun at high elevation angles would "see" the black or dark colored surface of a heat collector.

In certain preferred embodiments a dark heat collector surface is not incorporated in the siding but is spaced a small distance, usually less than an inch, behind the siding with the result that the system has the well-known greenhouse effect. Thereby long wave radiation from the dark heat collector surface cannot exit through the plastic and is trapped, while there is virtually no impediment to incoming visible and near infrared radiation from the sun.

Another feature of the siding panels utilized in the instant solar heating system automatically avoids heat loading by causing the mask built into the siding to have a highly reflective portion which is in the path of rays focussed by the lens from high elevation angles of the sun during summer months when heat transfer to the interior of the structure is not desired. Thus from the aspect of the summer sun, the wall of the house with siding panels according to the invention is effectively white or highly reflecting, for the winter sun it is dark and highly absorbing, and to the passerby viewing the house from near horizontal it appears to be of a color selected for decorative purposes.

The problems for which the system of the present invention provides solutions have been recognized to some degree by prior workers in the field. It has been proposed to use conventional metal siding on a housing structure with a space provided between the metal wall formed by the siding and the insulated wall of the house for the passage of air flow. Depending on the color of the metal siding, this provided a more or less efficient heat collector which could be used to transfer heat to air circulated between the metal siding and the insulated wall of the structure. U.S. Pat. No. 4,557,253 to Talbert et al. dated Dec. 10, 1985, Class 126/429, shows such a structure with vertical air flow. It will be noted that the Talbert et al. structure does not have the advantage of the greenhouse affect and does little to overcome the disadvantages discussed above. An arrangement with solar siding elements of very thin, high heat conductive sheet material and with air passages between such material and the outer surface of the building wall is shown in U.S. Pat. No. 4,327,708 to Taylor issued May 4, 1982, Class 126/429. The system described in the Taylor patent likewise does not have the advantage of the greenhouse affect and seeks to counteract the heat loading effect by providing a discharge for heated air into the atmosphere during summer months.

The basic physical principles whereby light impinging on a lenticular lens system or other lens system, or conversely light passing back out through such a system, is controlled to produce desired visual affects is well known, and is described in detail for example in U.S. Pat. No. 3,241,429 to Rice et al. Class 88-1. The Rice patent describes the structure and operation of toys or novelties in which a lenticular lens covered picture will have a different appearance when viewed from different angles, and may thus give a moving picture effect when tilted back and forth, for example. The same basic physical principals are utilized in forming the siding panels of the present invention with the result that the siding panels may have a decorative color when viewed from the horizontal whereas they would appear to be black if viewed from a small angle above horizontal line and would appear to be white if viewed from a large angle above horizontal. Nothing in the patent to Rice et al. would suggest the use of this very old lenticular lens principle to achieve the novel results accruing from use of siding panels according to the present invention.

In addition to providing the features and advantages described above, it is an object of the present invention to provide a controlled solar energy system having exterior panels which transmit solar radiation to a heat collector or other energy converter for certain sun elevation angles while causing such radiation to be reflected without significant absorption for other solar elevation angles.

It is another object of the present invention to provide exterior panels for a residential building or other building having a multiplicity of lenses formed in a transparent plastic material to selectively permit transmission of solar radiation only for certain angles of impingement of light on such panels.

It is still another object of the present invention to provide a controlled solar energy system with exterior siding or roofing panels formed of transparent material and having lenticular lenses with a radius of curvature less than 8 millimeters causing different horizontal bands at the back of the panel to be visible depending on the angle of elevation from which the panel is viewed.

It is yet another object of the present invention to provide a panel for use in solar energy applications which is formed at least in part of transparent material having lenses formed therein on a front side of the panel and having on the back side of the panel a mask, a portion of which is reflective, such reflection being caused in part by total internal reflection of light rays at an interface between volumes of different indices of refraction.

Other objects and advantages of the present invention will be apparent from consideration of the following description in conjunction with the appended drawings in which:

FIGS. 5-7 are schematic diagrams of alternative mask configurations for lenticular lens arrays according to the invention.

FIG. 13 is an isometric fragmentary view of a building structure having a controlled solar heating system according to the invention; and FIG. 14 is a sectional view of the structure of FIG. 13.

Figure 2:
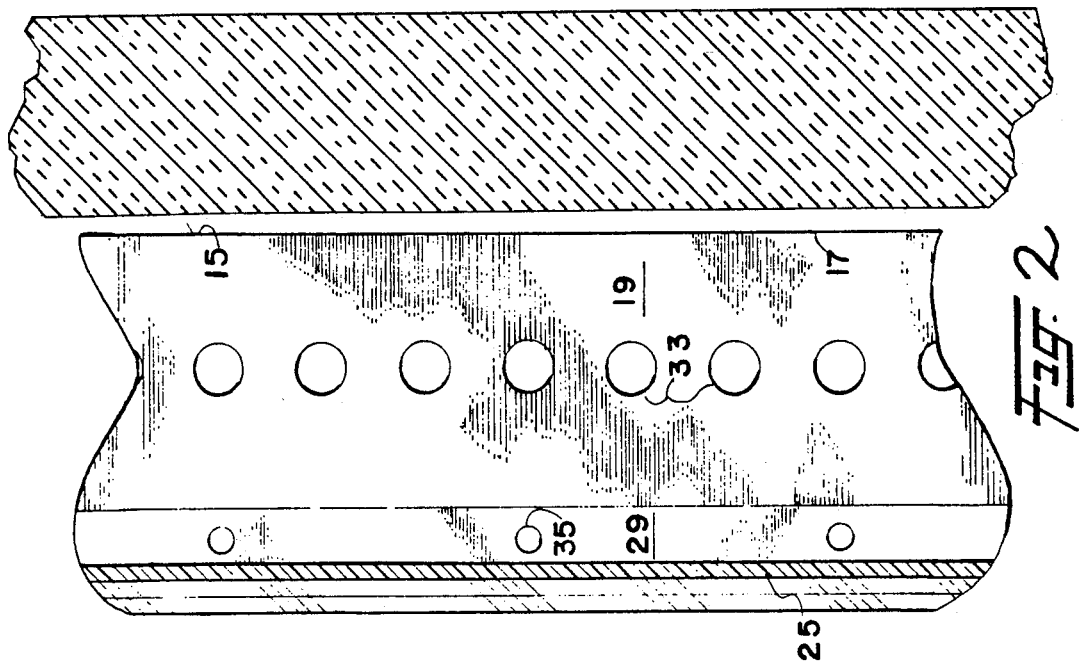
FIG. 2 is a sectional view taken along the line 2—2 in FIG. 1.
Figure 1:
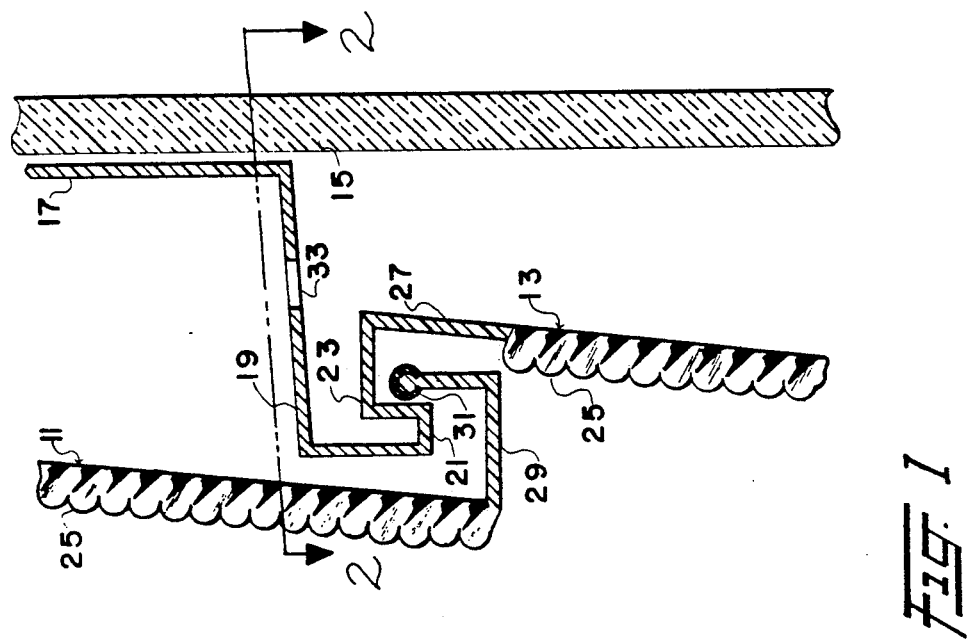
FIG. 1 is a sectional view of exterior siding panel construction employed in a controlled solar heating system according to the invention.
Figure 3:
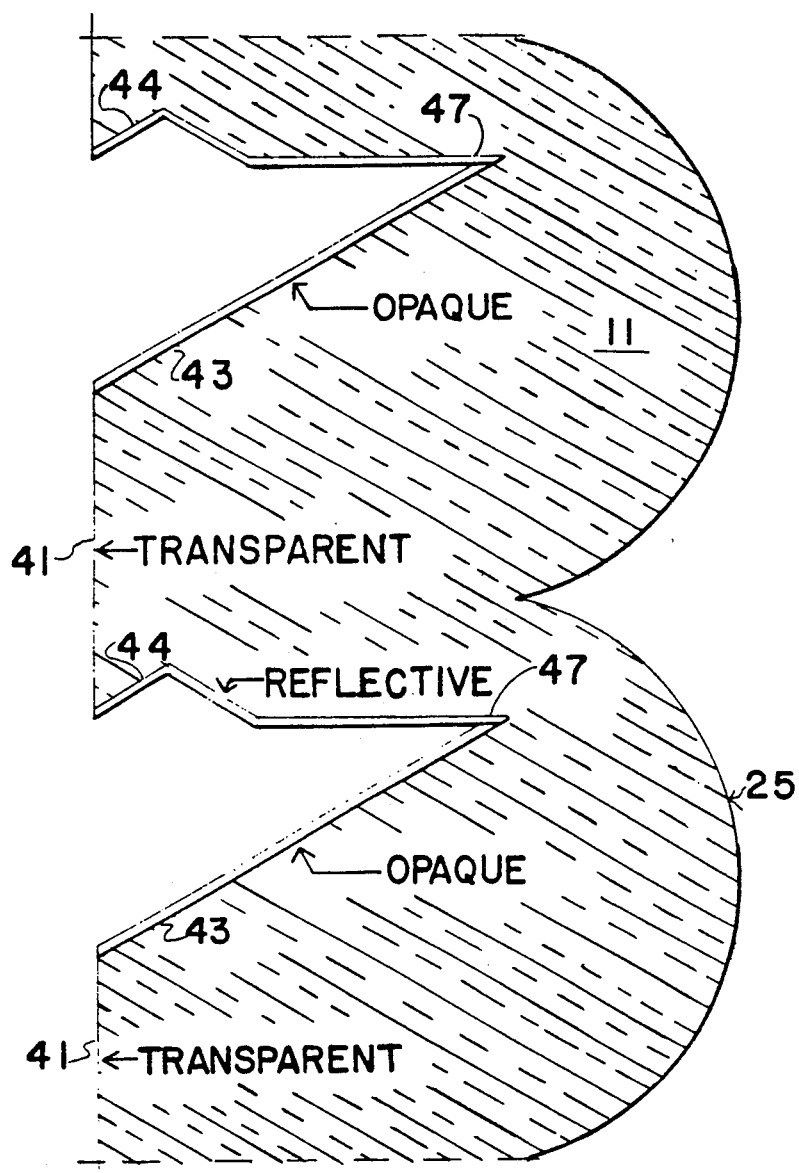
FIG. 3 is a greatly enlarged diagram showing the detailed structure and operation of the panel of FIGS. 1 and 2.

Referring now to the drawings, FIGS. 1-3 show siding panels for controlled solar heating according to the invention. The siding panels illustrated in FIGS. 1-3 have a configuration and outward appearance generally similar to conventional aluminum siding employed in the residential building industry for decades. That is, they constitute 4, 5, or 6 inch wide strips about eight feet long or longer secured in a horizontal array and generally provided with an overlapping, interlocking arrangement for easy installation and neat appearance. Aluminum siding is generally painted or otherwise coated with a decorative and protective material such as polyvinyl chloride.

While aluminum siding is probably the most common, similar siding is formed using other materials such as steel, plastic or the like. Conventional siding panels are well known, and are illustrated and described for example in U.S. Pat. No. 4,557,253 referred to above.

In FIG. 1, plastic siding panels 11 and 13 are shown broken away to illustrate how an upper panel 11 interlocks with a lower panel 13. Each panel 11 or 13 is provided with a top flange 19 extending horizontally along substantially its entire length. Flanges 19 include straps 17 to facilitate attachment of the panel 13 to a conventional insulated wall 15 of a residential or other building structure. Attachment of strap 17 to wall 15 may be by [hand nailing, machine fastener driving, adhesive, or any conventional means (not shown).]

Flange 19 preferably has a serpentine form including a projection 21 and an indentation 23 to interlock with a hook-like flange 29 on an upwardly adjacent panel. Flange 29 optionally has a bead 31 of elastomeric material to provide a seal at the horizontal juncture between rows of panels 11, 13. As seen in FIG. 2 optional weep holes 35 may be provided at intervals in the flange 29 to assure that water is not trapped at flanges 29. Weep holes 35 may be very small and widely spaced so that they permit little air flow through the exterior wall formed by panels 11 and 13.

Vertical air flow between panels 11 and 13 and wall 15 passes through openings 33 in flanges 19. Openings 33 are much larger than any openings 35 and may be on the order of one-half to one inch in diameter. They are also closely spaced so that they cause little resistance to vertical air flow in the space between panels 11, 13 and wall 15.

As illustrated in FIGS. 1 and 2, panels 11 and 13 are formed of transparent polyvinyl chloride, acrylic or polycarborate plastic material, and integrally formed therein is an array 25 of lenses, which are illustrated as lenticular or cylindrical lenses, the detailed construction of which is shown in FIG. 3.

The partially schematic showing of FIG. 3 is greatly enlarged for clarity, it being understood that the lenticular lenses of FIG. 3 would actually have a radius of curvature of less than 8 millimeters and would be typically of a radius of about 2.5 millimeters or one-tenth of an inch. Normally, the radius of curvature would be determined by the refractive index of the transparent plastic material and the desired thickness of the panel 11 so that the focal distance for parallel rays within the transparent plastic material would cause them to focus at or near the mask on the back side of the panel. Theoretically there is no minimum radius of curvature, but the mask should be positioned close to the focal position of the solar rays and radii of much less than one millimeter would probably be impractical in this embodiment.

One particular form of mask is shown in FIG. 3 wherein the back of the panel 11 has transparent windows 41 formed by the smooth surface of the plastic material of which the panel 11 is formed. The panel 11 is shown cut away to form other surfaces 43, 44 and 47.

As a practical matter, the opening bounded by the surfaces 43, 44 and 47 in the panel 11 would be usually filled with a plastic material which could be the same or different than the transparent material of panel 11; this would give the panel 11 greater strength. Such a filling material is not shown because it does not affect the optical masking function of the panel which is illustrated in FIG. 3 and also in FIG. 4. From FIG. 4 it will be seen that light rays indicated at 51 striking the panel 11 at an angle of elevation of about 55° or higher will strike a reflective surface 47 which is preferably a white, diffusely reflective pigment or other material with a high coefficient of reflection. Very little of the light diffusely reflected from surface 47 passes through transparent window surface 41; thus for direct sunlight at high elevation angles the panel 11 has the same solar energy reflecting characteristics as a highly reflective white surface. To the extent that any energy is absorbed by surface 47 it is not readily transmitted through panel 11, particularly if the opening defined by surfaces 43, 44 and 47 is filled with a solid heat insulating material.

As the elevation of solar rays striking panel 11 decreases from the elevation of rays shown at 51, the focal position shifts and with rays at an elevation of about 40° as shown at 53, the focal position just begins to fall on window 41 causing solar energy to be transmitted through the windows 41 of panel 11. Although there will be a transitional range of angles where part of the radiation is transmitted and part is reflected, this transitional range of angles may be small, limited to a few degrees or less, because images of the sun are focused or nearly focused at windows 41. Of course, for any one lenticular lens the images are spread horizontally along its length.

It should further be noted that while the image of the sun is focused or nearly focused on the windows 41 on the back side of panel 11, very little of the energy is absorbed and thus there is no substantial temperature rise despite intense energy concentration. Temperature rise is avoided on the surface 47 in part because it is reflective, but also the solar rays are not in focus on surface 47 and the energy concentration is consequently much less than at the focal point of one of the lenses 25. As the solar rays elevation decreases from about 40° as represented by the rays 53 to about 20° as represented by the rays 55, all or nearly all of the direct solar radiation is transmitted through windows 41 of panel 11.

Figure 4:
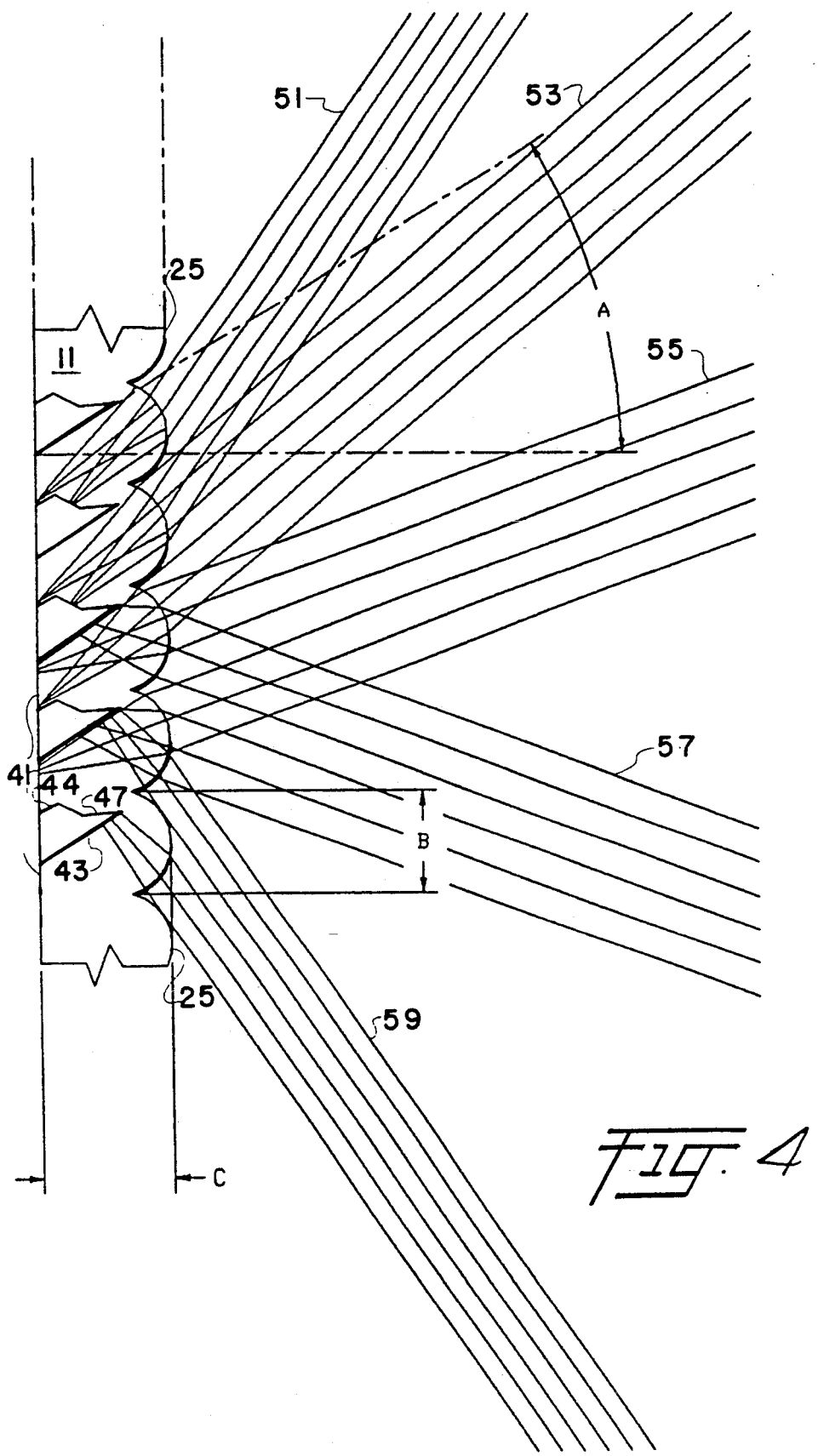
FIG. 4 is a schematic diagram of solar radiation ray paths useful in explaining the operation of the apparatus of FIGS. 1-3.

The mask comprising surfaces 43, 44, 47 and windows 41 in FIG. 4 is three dimensional. Positioning of surfaces 43, 44 and 47 serves to limit the transmission of solar rays from a particular one of the lenses 25 to its corresponding window 41 and the opaque mask portions adjacent that window. A protrusion of surfaces 44 and 47 into the body of the panel 11 causes rays with elevation angles greater than that of the rays 51 to be intercepted and reflected which would otherwise have been directed to and through the next lower one of windows 41 as seen from FIG. 4; thus the three dimensional configuration of surfaces 43, 44 and 47 permits the lens array and mask arrangement to be operational over a wide range of angles in a desired manner. While the three dimensional mask configuration is not essential to function of apparatus according to the invention, a simple one dimensional mask, stripes printed between windows 41 for example, would tend to allow high angle radiation to leak through the panel by falling below the mask stripe intended to intercept it onto the subadjacent window. While this could be acceptable in certain applications, it would be quite undesirable for the solar siding application illustrated in FIGS. 1 through 4.

Figure 10:
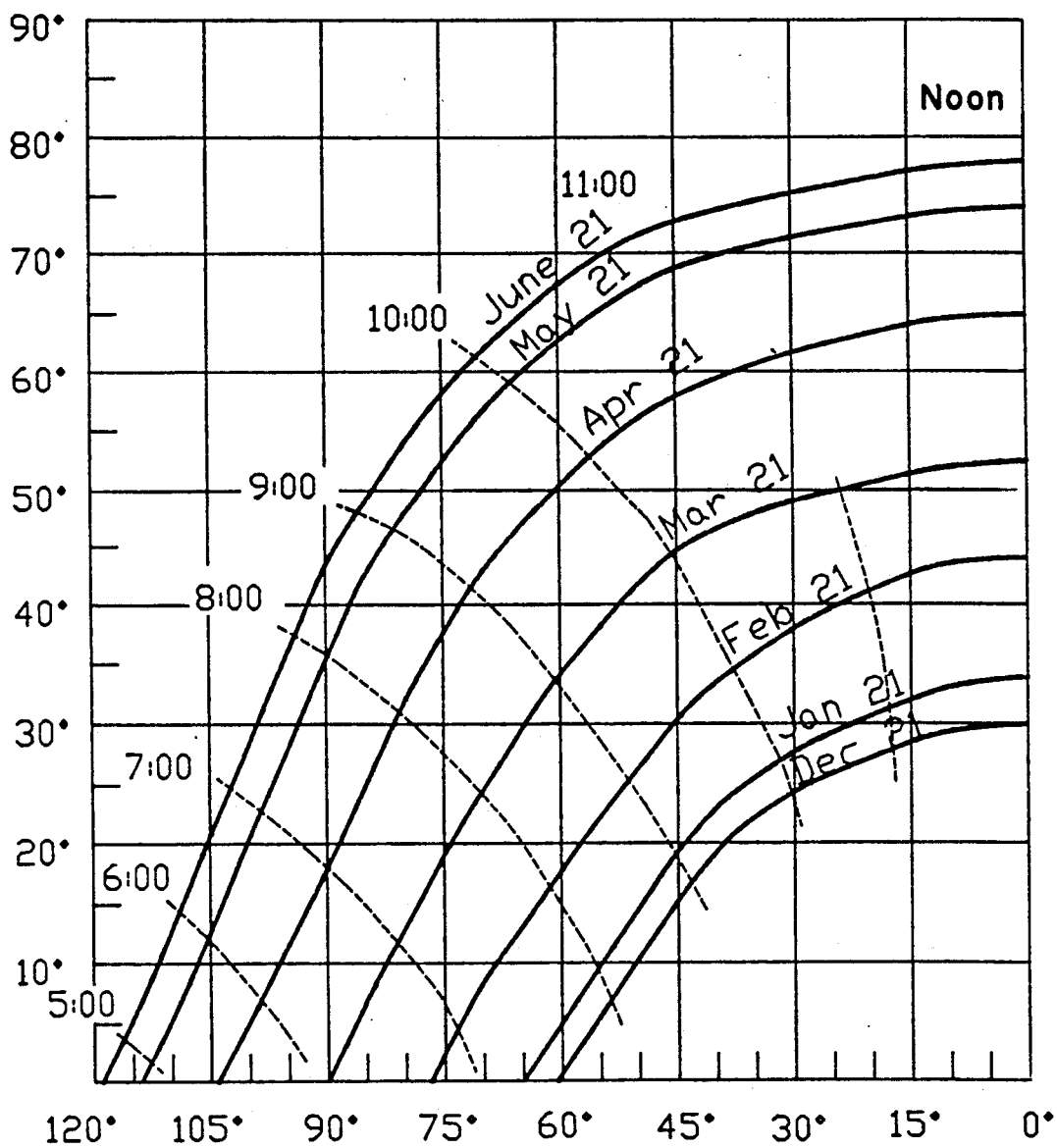
FIG. 10 is a diagram of solar elevation and azimuth angles presented for a better understanding of the invention.

The significance of this selected transmission of solar radiation at particular elevation angles can better be understood by a reference to FIG. 10 showing approximate direct radiation elevation and azimuth angles at various times of day and at various times of the year. FIG. 10 shows only six months of the year and only the morning hours, it being understood that elevation angles of the time of day are symmetrical about 12 noon and elevation angles for time of the year are symmetrical about June 21.

The diagram in FIG. 10 is for a latitude of approximately 36° and it will be understood that for higher latitudes the elevation angles will be lower, while for lower latitudes the elevation angles will be higher. The diagram of FIG. 10 is intended for the Northern Hemisphere, and in the Southern Hemisphere sunny walls would be the northern walls and the winter solstice (lowest sun elevation) would be about June 21, while the summer solstice (highest sun elevation) would be about December 21.

The elevation angles of FIG. 4 are the elevation angles at 12 noon indicated in FIG. 10 at 0°. This does not mean, however, that the angle relationships of FIG. 4 are appropriate only at noon because the significant angle of solar radiation on a South facing wall is not the true elevation angle but the projection of the direct solar radiation vector on the north-south vertical plane. During the middle daylight hours this projected angle does not differ greatly from the 12 noon true elevation angle as shown in FIG. 10.

Taking specific values from FIG. 10, the elevation angle for December 21 is the lowest angle and is approximately 30°. Direct solar radiation at winter solstice at 36° latitude is 30° compared to the minimum angle of transmission of 20° indicated by rays 55 in FIG. 4.

However, in a typical application, the structure of panel 11 and their attachment to a vertical wall will cause the lenses 25 to be tilted at an angle of up to about 10° from the vertical and hence the solar radiation elevation angle corresponding to rays 55 would be 30° and just within the acceptance angle of windows 41 of panel 11 when affixed to a vertical wall at a 10° angle.

Assuming the same 10° tilt angle for panels 11, the other end of the acceptance range of windows 41 represented by rays 53 would be an actual solar radiation angle of 50°. Referring to FIG. 10 it will be seen that this represents a date of early March for cut-off of solar radiation which would generally avoid heat loading the structure at a time of year when outside temperatures might require air conditioner operation. Solar radiation transmission would resume about late September.

It will be appreciated that ideally the optical configuration of panels 11 could be varied to produce an abrupt or a gradual cut-off of direct solar radiation according to a time table best suited to the climate in which the structure was located, relative costs of heating and cooling, and many other factors. In practice it will probably be sufficient to produce panels which are generally suitable for ranges of 5° in latitude (e.g. 20°–24°, 25°–29°, 30°–34°, 35°–40°, etc.). While systems employing controlled solar heating are not contemplated to be particularly useful in tropical latitudes, certain roof panels employing features of the invention could find use in such latitudes.

Referring again to FIGS. 3 and 4, it will be noted that while it is not intended for solar radiation to impinge on surfaces 43, light rays at an elevation angle lower than rays 55 in FIG. 4 such as rays 57 or rays 59 would strike surface 43. By the optics principle of reciprocity a passerby viewing the panel 11 from any eye elevation angle less than the angle of rays 55 down to very large negative elevation angle as shown by rays 59 would see light diffusely reflected from some portion of surfaces 43. Therefore, according to the invention, it is desirable to cause the surfaces 43 to be selectively reflecting of a desired color so that panel 11 would appear to passersby at any normal eye elevation angle to have the color of surface 43. The surface 43 may be colored to match or harmonize with the color of other siding on walls for which conventional siding rather than controlled solar heating panels were used. Since direct solar radiation does not strike surfaces 43 the color of such surfaces does not affect the selective radiation transmission function of panels 11.

It will be noted that the three dimensional configuration of surface 43, 44 and 47 is important to implement this feature whereby the apparent color of the siding panels to the passerby may be determined as desired, rather than having the siding appear white or black depending upon the eye elevation angle from which it is viewed. Of course this cosmetic feature of the apparatus of FIGS. 1 through 4 is not essential to the controlled solar heating function which can be implemented at least moderately well with flat one dimensional masking between windows 41 in certain applications.

In the previous discussion, only direct solar radiation and not other radiation from the sky has been considered. This is a practical approach since the greatest part of utilizable solar radiation is direct solar radiation. If radiation other than direct solar radiation were considered, it would add a small but significant amount of additional usable solar energy in the winter time; and in the summer time the amount of such energy would be insufficient to have any material affect, particularly in view of the fact that heated air between panels 11, 13 and the insulated wall 15 need not be conveyed into the building and could be allowed to escape to the atmosphere.

While the arrangement illustrated in FIGS. 1 through 4 has contemplated that panels 11 would be tilted with respect to the vertical by a small definite angle, it is apparent that the location of windows 41 and to some extent the arrangment of mask surfaces 43, 44 and 47 could be shifted to provide virtually any variation in the acceptance angles for solar radiation that is desired. Thus arrays of lenses 25 could be incorporated in vertical windows for greenhouses or for other structures, or could be incorporated in non-vertical windows or skylights with simple modifications of the mask arrangement in accordance with known principles of the optical arts.

The angle A shown in FIG. 4 is approximately 32°, but this angle would be varied in optimizing the panels 11 for particular latitudes. The angle A would be greater for lower latitudes and lesser for higher latitudes in general. The panel 11 of FIG. 4 has a pitch or spacing for lenses 25 indicated at B which is equal to about two millimeters in this example. The outside thickness dimension of panel 11 indicated at C is about 2.5 millimeters in this example.

The radius of curvature of lenses 25 is not drawn to scale and it would be determined, taking into account the refractive index of the material of panel 11, to focus parallel rays at or near the back surface of panel 11 and windows 41.

Considering now the specific application of a lens array as shown in FIGS. 3 and 4 to siding covered walls as illustrated in FIGS. 1 and 2, this configuration operates in a generally conventional energy collection mode, utilizing the greenhouse effect and solid-to-air convection heat transfer. Insulating wall sheathing 15 preferably has a black or dark outer surface to convert the solar radiation passing through panels 11, 13 to heat energy. A preferred embodiment would have an aluminum foil layer on the outside of the sheathing 15 which layer was darkened on the outer side by an anodizing process or other process to maximize absorption and minimize reflection from the foil.

With a configuration as illustrated in FIG. 1 illuminated with low elevation angle solar radiation characteristic of the winter months, a very high percentage of solar radiation incident on the wall would be transformed into heat energy of the air passing upwardly between panels 11 and 15. Such air would be directed and controlled by conventional means to provide space heating or otherwise utilize the heat energy. As previously explained, the panels 11, 13 would act during months of high sun elevation to prevent significant heating of the air between the panels 11, 13, and wall sheathing 15, and even less transfer of heat to the interior of the house. Prior patents have suggested that outside ambient air could be circulated in the space between an outer wall of siding, and an inner insulating wall in certain circumstances; this technique could of course be applied to structures as shown in FIG. 1 and other structures according to the invention.

The specific arrangement of lenticular lenses and masking structure is subject to considerable variation as will be understood from consideration of the alternative embodiments of FIGS. 5, 6 and 7. An alternative form of panel 61 is shown in FIG. 5 having an array of cylindrical lenses 62 similar to that shown in FIG. 4 and wherein the back side of the panel is of serrated shape. Each indentation on the back of panel 61 has a transparent window 63, a reflective mask portion 65, and an opaque mask portion 67 which may have a color chosen for decorative purposes.

In FIG. 5, higher elevation rays 69 and lower elevation rays 68 show the approximate range of angles of solar radiation which pass through windows 63. The panel 61 is shown tilted only slightly, and for the position shown the acceptance range for solar radiation may be about 22° to about 42°. The lower acceptance angles for the windows 63 in FIG. 5 could be suitable for a building located in a northerly (higher) latitude of about 45°.

It will be noted that the panel 61 of FIG. 5 differs from the panel 11 of FIG. 4 in that the opaque and/or reflective mask portions are readily accessible at the rear face of the panel 61 and could be applied by conventional painting, printing or coating techniques in a simple manner. It should also be noted that at first glance one would assume that some negative elevation angle rays striking the lenses 62 in FIG. 5 would pass through window 63, and a passerby with a viewpoint from a negative elevation angle would thus see through window 63 rather than seeing the reflective surface 67. This is not the case, however, because of total internal reflection of such rays at window 63 which would cause such low elevation angle rays to be totally reflected with the result that a passerby at a low elevation angle would see the reflection of an opaque surface 67 on the next serration about that seen by the passerby at a horizontal elevation.

Still another alternative form of panel 71 is shown in FIG. 6 wherein an array of lenses 72 is generally similar to those previously described and the rear surface of panel 71 is generally flat. The orientation of panel 71 is about 5° from vertical, but it will be understood that the orientation of the panel will generally be determined by its use whether on siding, windows, roofing, or the like. Although the rays are not illustrated in FIG. 6, it will have an acceptance angle of about 20° for solar radiation, which could be enlarged or reduced by enlarging or reducing the relative dimensions of window 73 and masked portion 75. The top side of mask portion 77 masks and generally reflects high angle solar radiation whereas the lower face of mask portion 77 will be visible to passersby at low positive or negative elevation angles.

The mask configuration of FIG. 6 may be considered to be three dimensional at least as to mask portion 77 but the simple configuration thereof lends itself to fabrication by extrusion techniques; in the alternative slots in the plastic panel to accommodate mask portion 77 could be created by mechanical cutters after which such slots could be filled with opaque pigments of the desired color. Mask portion 75 may be produced in the same way at the same time or may be simply applied by painting, printing or otherwise coating stripes on the back of panel 71.

FIG. 7 shows yet another alternative panel 81 suitable for roofing or skylight applications. It will be understood to be generally similar to panel 61 shown in FIG. 5 except that it is oriented to provide a skylight or a roofing panel. The array of lenses 82 is generally similar to the lenticular lenses previously described as are the windows 83 and the mask portions 85 and 87. Panel 81 is disposed about 25° from the horizontal, and the solar radiation acceptance angle for windows 83 is accordingly about 25° to about 45°.

It may be noted that larger mask portions 85 are the reflective mask portions for high elevation angle solar radiation, and that they are complemented by the total internal reflection from windows 83. Mask portions 87 may or may not be included in a panel such as 81, but if present they will serve to alter the apparent color of the roof as viewed from the horizontal or near horizontal. If panels 81 are used as a skylight, the solar radiation will of course pass through and be absorbed in the interior of the structure. Note that such a skylight will block only direct solar radiation in the summer while passing indirect light from the sky for illumination. Such panels could also be used as transparent windows for solar water heaters or the like. If applied over black roofing material, radiation passing through windows 83 would be absorbed in the black roofing material if not otherwise utilized. As in the case of panels 61 the acceptance angle of panels 81 can be increased or decreased by correspondingly increasing or decreasing the size of windows 83. In some cases it may be desired to completely close windows 83 with mask portions 87 in which case panel 81 would serve only as a reflector rather than a collector of solar energy and could have the advantage of presenting an attractive appearance by selection of a desired color for mask 87.

Figure 8:
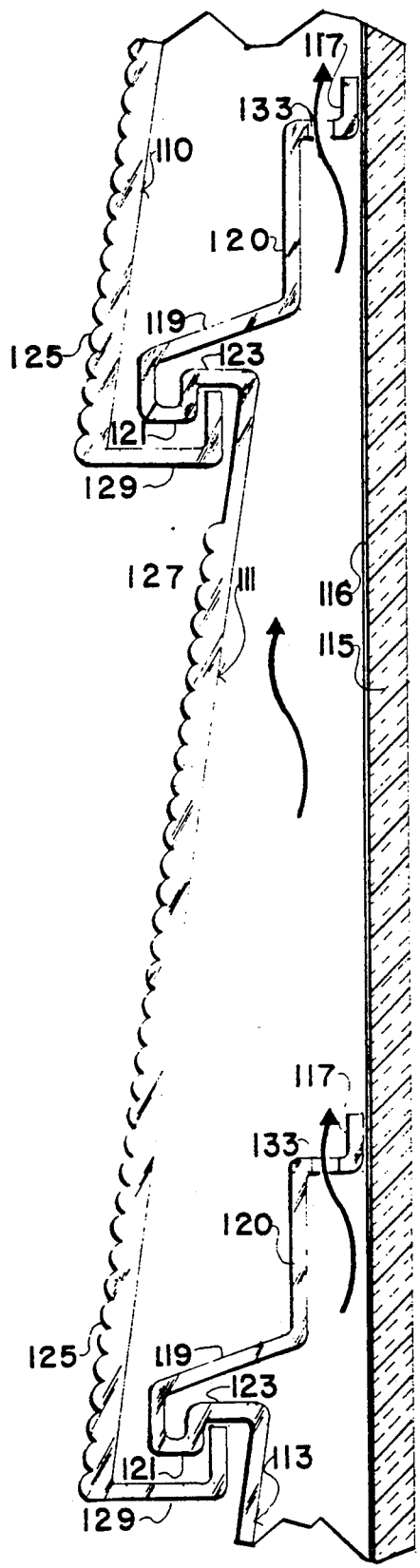
FIG. 8 shows an alternative form of siding panel providing improved heat exchange in a system according to the present invention.

A useful variation in siding panel construction to improve heat transfer of solar energy to air between the siding and the structure insulating wall is shown in FIG. 8. This siding panel structure is particularly useful in connection with siding panels with the lenticular lens features of FIGS. 4, 5 or 6, but it is also potentially useful in any application where heat transfer from a heat collector behind the siding to the confined air flow is desirable. Siding panels 110, 111 and 113 of FIG. 8 are generally similar to siding panels 11 and 13 of FIG. 1 and thus only the differences will be discussed in detail.

Each of the panels 110, 111 and 113 is provided with a lens array 125 and will also have a mask arrangement as shown in FIGS. 4, 5, or 6 (not shown in FIG. 8). Siding panel 113, for example, has a top flange 119 including a strap 117 to facilitate attachment to conventional insulated wall sheathing 115. Flange 119 has a serpentine form including a projection 121 and an indentation 123 to interlock with a hook-like flange 129 on an upwardly adjacent panel. Openings 133 are provided in flanges 119 for the passage of vertical air flow between panels 110, 111 and 113, and the insulated wall 115 which is preferably provided with a black foil lamination 116. It will be noted, however, that flange 119 has a vertical extension 120 which causes the air flow to be directed more closely along wall 115 so that the average velocity of air proximate to wall 115 will be higher with corresponding increased heat flow from heated wall 115 to the air passing upwardly behind panel 111, for example. Yet another alternative siding panel structure is shown for siding panels 91 in FIG. 9. Panels 91 are preferably formed of a heat conductive material such as aluminum which is, of course, opaque. The shape in the interlocking mechanism of siding panels 91 can be essentially similar to that shown and described with reference to panels 11 and 13 in FIG. 1 and such description will not be repeated here. On the outside of each siding panel 91 is a transparent plastic layer 93 having a multiplicity of lenticular lenses 95 formed therein.

Lenses 95 will be provided with mask configurations as in FIG. 4, 5 or 6, differing only in that the window of the previously described mask will be replaced with a black heat absorbing surface which may be imprinted on plastic sheet 93 or on the face of aluminum panels 91. Accordingly, the selective solar energy utilization of the siding panels 91 will be similar to that previously described as to solar radiation which is reflected and rejected, but as to solar radiation which is accepted, it will as such not pass through panel 91 but will rather be absorbed at a black or absorbing surface at the rear face of plastic sheet 93. It will then be the siding panels 91 themselves which are heated by the solar radiation rather than the insulating wall 15, and the heat exchange will take place between the moving air and the back side of panels 91.

Figure 9:
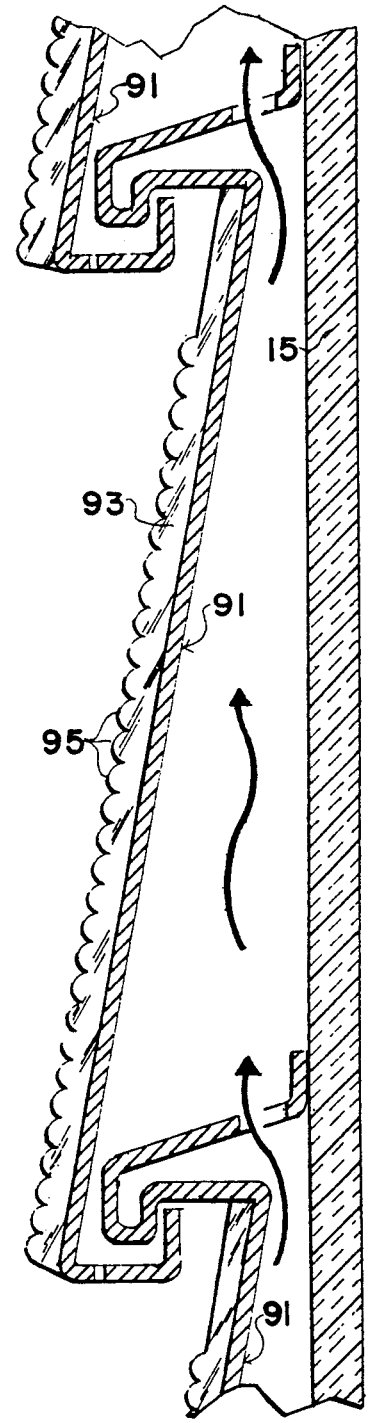
FIG. 9 shows another alternative form of siding panel according to the invention wherein the solar heat absorber is an integral part of the siding sheet.

Although the siding panel variation of FIG. 9 lacks some advantages of the greenhouse effect, it has particular advantages which may be important. The shape of the aluminum body of the siding panels 91 does not differ greatly from that in common use for conventional siding, and thus panels 91 could be fabricated using existing manufacturing equipment. The plastic sheets 93 applied to the body of the panel 91 may be very thin since they are not relied upon for structural strength. As the plastic sheet 93 is made thinner it is also necessary to make the radius of curvature of lenses 95 shorter, and to make their spacing closer. Despite this limitation it is feasible to form the plastic sheet 93 as thin as about 0.2 millimeters. Since this is not much greater thickness than plastic coating employed on aluminum siding for decorative purposes and for weather protection, it will be appreciated that the aluminum siding panels 91 with plastic sheet lenticular lens 95 thereon are potentially very economical to manufacture, even if compared with conventional siding without solar energy collection and control properties.

Figure 11:
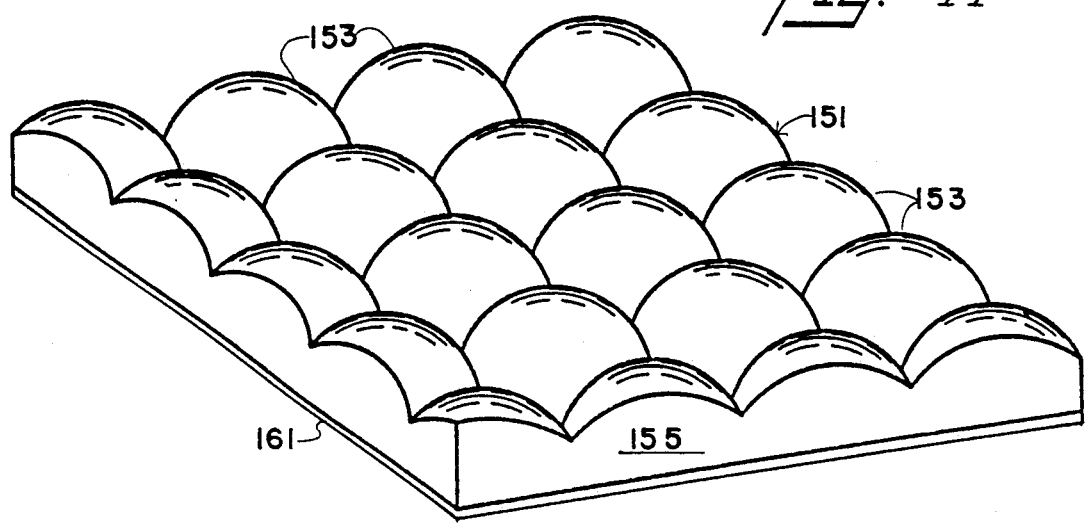
FIG. 11 is an isometric fragmentary drawing of an alternative form of siding panel employing spherical rather than lenticular lenses.
Figure 12:
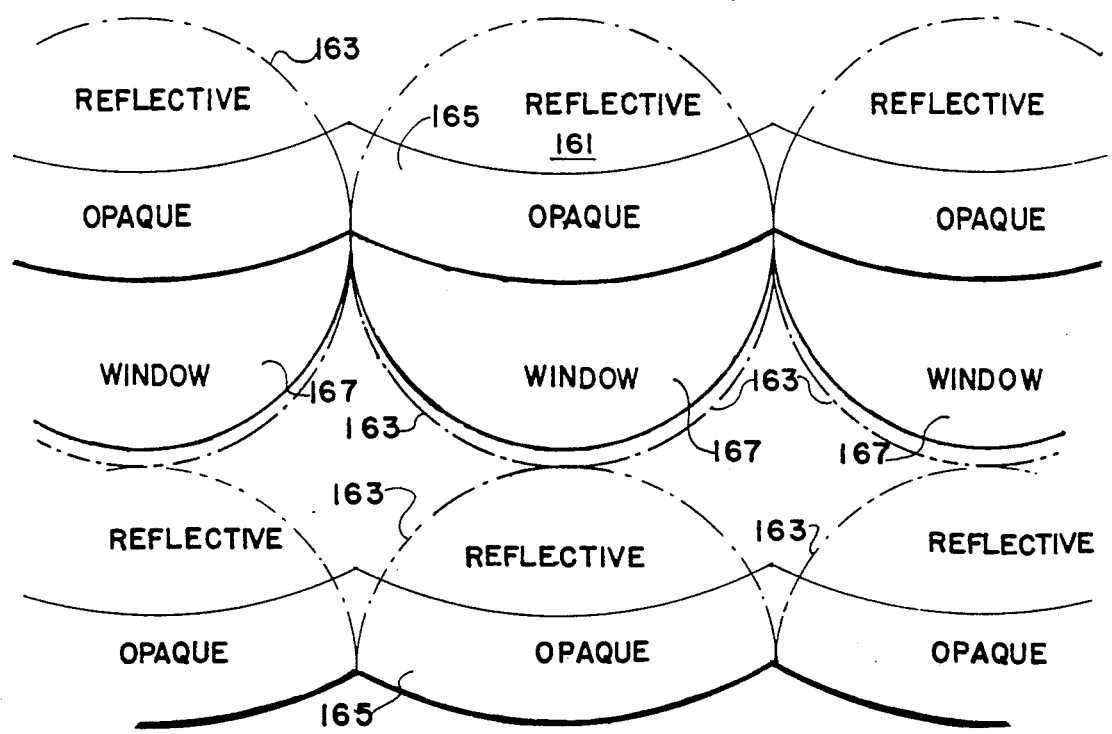
FIG. 12 is a partially schematic illustration of a mask for use with the spherical lens array configuration of FIG. 11.

FIGS. 11 and 12 show an array of spherical lenses 151 which may be substituted for one of the arrays of lenticular lenses 25, 62, 72, or 82 together with a mask 161 suitable to cooperate with such a lens array.

The array of lenses 151 has a multiplicity of generally spherical lenses 153 molded into a plastic sheet 155. As in the case of the previously described lenticular lenses, the focus of lenses 153 for parallel rays impinging thereon is preferably at or near the back side of plastic sheet 155 where mask 161 will normally be resident. The radius of curvature for lenses 153 and the thickness of sheet 155 will vary depending upon the particular structure in which the lens array 151 is incorporated, generally in the manner previously described with respect to the lenticular lenses.

Mask 161 as illustrated is an appropriate mask for siding panels or other vertically oriented solar heating panels. Dot-dash circles 163 represent the projection of the central portions of lenses 153 on mask 161. It will be noted that mask 161 is essentially two dimensional in contrast to the previously described masks which are generally three dimensional.

Extending across mask 161 horizontally behind each row of lenses 153 is an opaque mask portion 165 which may be given a color that will be observed as the color of array 151 when viewed from a horizontal or nearly horizontal angle. Immediately below mask opaque portion 165 are windows or transparent portions indicated at 167.

Windows 167 are shown as crescent shaped in FIG. 12, but the shape of the edges of the windows is not critical and they could be formed of the undulating band shape of the opaque mask portion 165 or could even be a straight band extending across the horizontal extent of the mask. It may also be more convenient and just as effective to make opaque mask portion 165 a straight band rather than of undulating shape as shown in FIG. 12.

Above opaque mask portion 165 and below the superadjacent row of windows 167 the mask will normally be highly reflective in order to reflect high elevation angle light rays reaching this portion of the mask from the superadjacent window. As previously noted, in some cases it will be appropriate to have the opaque mask portion 165 highly reflective also, so that there would effectively be no boundary between the opaque mask portion and the reflective mask portion. One effective way to create a mask such as 161 for a particular lens array 151 and a particular solar path relative thereto is to provide a lens array 151 with a photosensitive backing and to move it in a predetermined relationship mimicing such path to a suitable discrete light source (or vice-versa) thereby exposing a portion of the light sensitive surface which may be then developed to fix an image and produce a mask or a pattern for a mask appropriate to a particular application for the lens array 151. Of course, the desired mask for a particular application and solar path to be used with a particular lens array 151 can also be computed utilizing well known ray tracing or other optical design techniques rather than using the empirical approach described above.

It should be noted that the array 151 is shown as rectilinear but lenses 153 could equally well be arranged in a hexagonal array. Also the lenses 153 are characterized as spherical but it may be advantageous to utilize aspherical lens surfaces in some circumstances.

The advantage of the spherical array of lenses 151 compared to the previously described lenticular lens arrays is that the transmission, absorption and reflection characteristics of the array mask and associated structure can be made sensitive to horizontal angles (azimuth) as well as vertical angles (elevation). One might therefore wish to use a spherical lens array for walls of a structure other than south-facing walls or for roof panels or skylights. It should be mentioned that in unusual cases the lenticular lens arrays might also be adapted to other than south facing walls by causing the lenticular lens alignment to be non-horizontal.

While the lenses for the various lens arrays described and shown are preferably formed of durable transparent plastic, any transparent material could be employed, even glass or glass-like materials.

FIGS. 13 and 14 illustrate how the siding panels according to the invention may be employed in a solar energy collection system according to the invention. A conventional wood frame structure 210 is shown with conventional insulating sheathing 213 secured by nails or other conventional means (not shown) to the studs 215 of a south wall of structure 210. Insulating sheeting 213 may be formed of rigid urethane foam and is preferably covered with aluminum foil 217 having a black or dark light-absorbing surface on the outside. The siding panels according to the invention such as panel 111, in FIG. 8 are installed over sheathing 213 as shown at 211 leaving an air space between the siding wall formed by panels 211 and the sheathing 213 generally similar to the air space shown in FIG. 8. The space is closed at the bottom by a suitable molding 219 and at the top opens into a manifold 221 in the form of a metal or plastic air duct.

A wood facing 223 has one or more openings 225 therein through which extends an air duct 227 communicating with manifold 221. Air duct 227 directs the flow of heated air to a place of utilization inside the structure such as space heating air vents or the like. As best shown in FIG. 14, duct 227 can be routed between rafters 231 and joists 233 in accordance with the usual practice for air heating systems. Although no furring strips are required in this arrangement, the siding could be installed on furring strips if circumstances made that desirable.

Heated air exiting through duct 227 is replaced by air from an air mover 235 conducted through main duct 236 to a manifold 237 and hence to branch ducts 239 passing through openings 241 in sill 243 and insulating sheathing 213. The details of the air mover 235 and the space heating system form no part of the invention and are not described in detail.

As previously mentioned, the various ducts or manifold 221 may be provided with dampers and controls so that warm air collected in manifold 221 may be exhausted to the outside rather than being conducted through duct 227 for utilization within the structure.

From the foregoing description and explanation, it will be understood that apparatus according to the invention provides novel means for the utilization of solar energy which is quite efficient during months that the ambient temperature generally requires space heating of the interior of the structure while during the summer months the variations in solar elevation angle are utilized to automatically cut off the absorption of solar radiation to minimize the heat load imposed on the living space thereby minimizing or eliminating the need for refrigeration space cooling. The apparatus may also provide an attractive appearance that conceals its function.

Although many variations of the apparatus and modifications thereof for different circumstances have been shown, described or suggested, other variations and modifications of the apparatus will be apparent to those skilled in the art, and accordingly the scope of the invention is not to be considered limited to the particular embodiments or variations thereof described or suggested but is rather to be determined by reference to the appended claims.

What is claimed as invention is:

1. A building exterior panel for a controlled solar heating system comprising:
   a rigid generally planar sheet of at least partially transparent material,
   means for securing said sheet on the exterior surface of a building in spaced relation to said surface to provide a passageway for air along the inner side of sheet,
   means at the top and bottom of said sheet for providing an overlapping seal between adjacent panels,
   a multiplicity of lenses on the outer surface of said sheet with a pitch of no more than two millimeters for focusing solar radiation passing through said sheet, and
   masking means in the path of solar radiation passing through said sheet with a reflecting portion of such radiation having a first direction relative to the plane of said sheet and having windows to permit radiation having a second direction to pass through said sheet, said masking means being spaced from said lenses at approximately the focal lengths thereof,
   whereby solar radiation impinging on a building partially covered with such panels will selectively be transmitted for energy utilization and other light energy will be reflected.

2. Apparatus as recited in claim 1 wherein said lenses are lenticular.

3. Apparatus as recited in claim 1 wherein said lenses have a radius of curvature of no more than about 2.5 millimeters.

4. Apparatus as recited in claim 1 wherein said means for providing an overlapping seal comprises flanges.

5. Apparatus as recited in claim 1 wherein a portion of said masking means reflects visible wavelengths by total internal reflection.

6. Apparatus as recited in claim 1 wherein said masking means has a portion that selectively reflects visible light of one color, and wherein such portion is positioned to reflect horizontally impinging radiation.

7. A building exterior panel for a controlled solar heating system comprising:
   a rigid generally planar sheet formed at least partially of transparent material,
   means for securing said sheet on the exterior surface of a building in spaced relation to said surface to provide a passageway for air along the inner side of said sheet,
   means at the bottom of said sheet for providing an overlapping seal between adjacent panels,
   a multiplicity of lenses associated with said sheet with a pitch of no more than two millimeters for focusing solar radiation passing through said sheet, and
   masking means in the path of solar radiation passing through said transparent material for intercepting a portion of such radiation having a direction within a predetermined angular range relative to the plane of said sheet,
   whereby solar radiation impinging on a building partially covered with such panels will be transmitted for heat collection during winter months of low sun elevation and will be reflected to avoid heat loading during summer months of high sun elevation.

8. Apparatus as recited in claim 7 wherein said sheet is formed of transparent plastic material and said masking means are three dimensional and extend from near the lenses' focal points toward the exterior side of said sheet.

9. Apparatus as recited in claim 7 wherein said masking means has a portion that selectively reflects visible light of one color, and wherein such portion is positioned to reflect horizontally impinging radiation.

10. Apparatus as recited in claim 9 wherein said lenses are lenticular and have a radius of curvature of no more than about 2.5 millimeters.

11. Apparatus as recited in claim 7 wherein said masking means are three dimensional and extend from near the lenses' focal points toward the exterior side of said sheet and each has a portion that selectively reflects visible light of one color, and wherein such portion is positioned to reflect horizontally impinging radiation.

12. Apparatus as recited in claim 11 wherein the intercepting portion of said masking means reflects a broad range of wavelengths including visible and near infrared wavelengths.

13. Apparatus as recited in claim 7 wherein said lenses are lenticular and have a radius of curvature of less than 8 millimeters.

14. Apparatus as recited in claim 13 wherein the intercepting portion of said masking means includes a face of said partially transparent material oriented to cause total internal reflection of a portion of such radiation.

15. Apparatus as recited in claim 13 wherein said masking means has a portion that selectively reflects visible light of one color, and wherein such portion is positioned to reflect horizontally impinging radiation.

16. Apparatus as recited in claim 7 wherein said generally planar sheet comprises an opaque sheet of rigid material and said transparent material comprises a layer of plastic on one surface of said generally planar sheet, said layer being shaped to form said lenses.

17. Apparatus as claimed in claim 16 wherein said rigid material is formed of metal.

18. A controlled solar heating system comprising:
   a heat collecting panel mountable on a building exterior including a plurality of rigid generally planar sheets of at least partially transparent material and means for securing said sheets on the exterior surface of a building in spaced relation to said surface to provide a vertically extending passageway for air between said exterior surface and said sheets,
   flanges at the top and bottom of said sheets for interlocking said sheets with one another, said flanges having openings therein for passage of air vertically therethrough,
   a multiplicity of lenses formed in the outer surfaces of said sheets with a spacing of not more than two millimeters for focusing solar radiation passing through said sheets,
   masking means in the path of solar radiation passing through each of said sheets with a reflecting portion for such radiation having a first direction relative to the plane of each of said sheets and having windows to permit radiation having a second direction to pass through said sheets, said masking means being spaced from said lenses at approximately the focal lengths thereof,
   a manifold at the top of said panel for receiving heated air from said passageway, and
   at least one air duct connecting with said manifold to conduct heated air to an air mover, whereby solar radiation impinging on said heat collecting panel will be transmitted for heat collection and heat utilization by said system during winter months and will be reflected to avoid heat loading during summer months.

19. Apparatus as recited in claim 18 wherein said lenses are lenticular.

20. Apparatus as recited in claim 18 wherein said lenses have a radius of curvature of no more than 2.5 millimeters.

* * * * *